United States Patent
Dochow et al.

(10) Patent No.: US 12,047,759 B2
(45) Date of Patent: Jul. 23, 2024

(54) SEAMLESS AUDIO TRANSFER IN A MULTI-PROCESSOR AUDIO SYSTEM

(71) Applicant: Continental Automotive GmbH, Hannover (DE)

(72) Inventors: Gerhard Dochow, Wetzlar (DE); Thomas Göhring, Wetzlar (DE); Meinrad Niemöller, Hüttenberg-Rechtenbach (DE)

(73) Assignee: Continental Automotive GmbH, Hannover (DE)

( * ) Notice: Subject to any disclaimer, the term of this patent is extended or adjusted under 35 U.S.C. 154(b) by 164 days.

(21) Appl. No.: 17/593,039

(22) PCT Filed: Mar. 5, 2020

(86) PCT No.: PCT/EP2020/055803
§ 371 (c)(1),
(2) Date: Sep. 7, 2021

(87) PCT Pub. No.: WO2020/178369
PCT Pub. Date: Sep. 10, 2020

(65) Prior Publication Data
US 2022/0191616 A1    Jun. 16, 2022

(30) Foreign Application Priority Data
Mar. 7, 2019   (DE) ..................... 10 2019 203 130.7

(51) Int. Cl.
*H04R 5/04*        (2006.01)
(52) U.S. Cl.
CPC .......... *H04R 5/04* (2013.01); *H04R 2420/01* (2013.01); *H04R 2499/13* (2013.01)

(58) Field of Classification Search
CPC ... H04R 5/04; H04R 2420/01; H04R 2499/13
See application file for complete search history.

(56) References Cited

U.S. PATENT DOCUMENTS 6,763,458 B1 * 7/2004 Watanabe ............. H04L 69/329
                                                        713/100
7,814,307 B2   10/2010 Powell et al.
(Continued)

FOREIGN PATENT DOCUMENTS

CN       1841267 A     10/2006
CN     101171564 A      4/2008
(Continued)

OTHER PUBLICATIONS

German Office Action dated Jul. 17, 2021 for the counterpart German Application No. 10 2019 203 130.7.
(Continued)

*Primary Examiner* — Daniel R Sellers

(57) ABSTRACT

A processing unit for an audio system of a vehicle comprises a first processing node, a second processing node and a program memory. The program memory may be overwritten by the first processing node and by the second processing node. After the processing unit has started up the first processing node may compute and write to the program memory an audio output. The processing unit may also perform a handover of the computing of the audio output from the first processing node to the second processing node when the first processing node has overwritten the program memory up to a predefined point and when the second processing node is operational. The second processing node is designed to compute the audio output after the handover, and to write this audio output to the program memory.

5 Claims, 3 Drawing Sheets

(56) References Cited

U.S. PATENT DOCUMENTS

| | | |
|---|---|---|
| 8,194,692 B2 | 6/2012 | Tsao |
| 9,071,214 B2 | 6/2015 | Thomsen et al. |
| 2005/0209719 A1 | 9/2005 | Beckert |
| 2005/0209852 A1* | 9/2005 | Beckert ............... B60R 16/0315 |
| | | 704/246 |
| 2006/0200573 A1* | 9/2006 | Lin ........................ H04N 9/641 |
| | | 709/231 |
| 2006/0255964 A1* | 11/2006 | Wong .................... G06F 1/3287 |
| | | 340/855.8 |
| 2006/0277400 A1* | 12/2006 | Veen ..................... G06F 9/4411 |
| | | 713/1 |
| 2008/0077943 A1* | 3/2008 | Pierce ................. G06F 11/1438 |
| | | 719/329 |
| 2008/0147917 A1* | 6/2008 | Lees ....................... G06F 3/162 |
| | | 710/52 |
| 2009/0083516 A1 | 3/2009 | Saleem et al. |
| 2009/0228615 A1 | 9/2009 | Beckert et al. |
| 2012/0221134 A1 | 8/2012 | Sasagawa |
| 2014/0115308 A1* | 4/2014 | Li ........................... G06F 9/485 |
| | | 713/1 |
| 2014/0281636 A1 | 9/2014 | Wong et al. |
| 2016/0328272 A1* | 11/2016 | Ahmed ................. G06F 9/4881 |
| 2022/0083346 A1* | 3/2022 | Nagano ................. G06F 9/4406 |

FOREIGN PATENT DOCUMENTS

| | | |
|---|---|---|
| CN | 101924526 A | 12/2010 |
| CN | 102667745 A | 9/2012 |
| CN | 107179868 A | 9/2017 |
| WO | 2015150871 A1 | 10/2015 |
| WO | 2015150872 A1 | 10/2015 |

OTHER PUBLICATIONS

International Search Report and the Written Opinion of the International Searching Authority mailed on Jun. 3, 2020 for the counterpart PCT Application No. PCT/EP2020/055803.

Chinese Office Action dated Aug. 26, 2023 for the counterpart Chinese Patent Application No. 202080015489.3 and DeepL translation of same.

Christian Linke, Audio Manager Documentation, https://docs.projects.genivi.org/AudioManager/.

Examination Report dated Dec. 15, 2023 from corresponding European patent application No. 20710850.7.

* cited by examiner

SEAMLESS AUDIO TRANSFER IN A MULTI-PROCESSOR AUDIO SYSTEM

CROSS-REFERENCE TO RELATED APPLICATIONS

This U.S. patent application claims the benefit of PCT patent application No. PCT/EP2020/055803, filed Mar. 5, 2020, which claims the benefit of German patent application No. 10 2019 203 130.7, filed Mar. 7, 2019, both of which are hereby incorporated by reference.

TECHNICAL FIELD

The invention relates to a processing unit for an audio system for a vehicle and to a vehicle comprising said processing unit.

BACKGROUND

Audio systems and/or warning systems can be fitted in vehicles. They can be used to entertain and/or inform the user or the driver. In addition, warning tones can be output via the audio system of the vehicle, or warning tones can be fed into the output signal from the audio system. As the multimedia systems in vehicles become increasingly complex, however, the time for these systems to reach full availability also increases.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In order to remedy this situation, two different processing nodes can be used, one of which starts up quickly and is responsible for the basic audio output such as warning tones, for instance. These warning tones should be available as soon as possible after getting into or starting the vehicle. The second processing node can be responsible for the multimedia audio output. In this case, a slightly longer time, for instance 30 seconds, may be acceptable for the start-up. The audio signals from these two processing nodes can then be mixed into an audio output by means of a mixer and output to the user via loudspeakers. Alternatively, as soon as it is operational, the second processing node can take over the computation of the audio output from the first processing node, although in this case a disturbing jump in the output of the audio signal may occur when a handover takes place between the two processing nodes.

Modern infotainment systems typically consist of a plurality of processing nodes. These processing nodes may be spatially distributed or be present as separate processing nodes in a silicon chip or exist purely virtually in a system controlled by a hypervisor. A first processing node (Early) starts up very quickly in order to provide the basic functions such as CAN bus and sound outputs. The second processing node (Multimedia), for instance comprising multimedia tasks, needs more time for the start-up as a result of the higher complexity. Extremely simple audio management (AM) is implemented on the first processing node in order to have available very quickly certain audio functions such as the playing of sounds (park distance control, doors being open, unfastened seatbelt, or chimes). Full audio management for all sources (multimedia), for instance radio, streaming, CD or MP3, does not become possible until the second processing node starts up.

No audio output is possible during the handover from the first processing node to the second processing node.

A first aspect relates to a processing unit for an audio system of a vehicle. The processing unit comprises a first processing node, a second processing node and a program memory. The program memory is designed to be overwritten by the first processing node and by the second processing node. The processing unit is designed such that, after the processing unit has started up, the first processing node computes an audio output, segment by segment, and writes to the program memory, or stores, saves or buffers in the program memory, the segments in succession. In addition, the processing unit is designed to perform a handover of the computing of the audio output from the first processing node to the second processing node when the program memory is overwritten with audio data by the first processing node up to a predefined point, so that an entire audio segment is available for the audio output, and when the second processing node is operational. The second processing node is designed to compute the audio output after the handover, and to write to, or buffer in, the program memory said audio output, likewise segment by segment.

The audio output can thereby be maintained continuously without loss of quality during the handover from the first processing node to the second processing node.

It should be noted that the first and second processing nodes can read and write rapidly to a jointly addressable program memory (shared memory). This program memory may be a Direct Memory Access (DMA) memory, which the audio output system reads out cyclically and segment by segment, and converts into the audio output signal. Initially, the first processing node computes the segments for the audio output performed by the audio output system, and as soon as the second processing node is operational or has started up and reached a state for the handover, the computation of the audio output segments can be handed over to the second processing node. Then the computation of the audio output on the first processing node can be paused. In addition, the exact playback position in the audio file that forms the basis for the audio output can also be stored in the shared memory. The computation of the audio output is handed over from the first processing node to the second processing node when the first processing node has overwritten the program memory with the audio output up to a predefined point. The first processing node overwrites the program memory for example in full with the audio output for an entire audio segment. Overwriting the program memory up to a predefined point can ensure that the output of the audio output by an audio output system works seamlessly during the handover, and that no interruption occurs in the output of the audio signal. In this case, the size of the audio data stored in the program memory (e.g. an entire audio segment) may be selected such that the output time for this audio data by the output mechanism (e.g. the DMA transfer mechanism) is greater than the time for the handover of the audio status and of the audio-output computation from the first processing node to the second processing node. The output can be performed on the basis of the audio output stored in the program memory.

It can hence be ensured that no interruption in the output of the audio output, i.e. of the stored audio signal intended for output, occurs during the handover between the processing nodes. This can improve the quality of the output of the audio output and prevent disturbing interruptions.

According to one embodiment, the first processing node is a fast-start up processing node for computing a basic audio output such as warning tones, for instance from an unfastened seat belt, an open door or from the park distance control. The second processing node is a processing node for computing a full audio output, for example for a multimedia system including navigation announcements, CD, MP3, streaming and/or radio. It should be noted that the full audio output can include the basic audio output.

An audio output here refers to an audio signal that is subsequently output by an audio output system. This audio output can be buffered in the program memory, and therefore this program memory can act as a buffer. The audio output can be computed directly, for example on the basis of a sinusoidal signal, or the audio output can be generated from a predefined audio file. For example, various predefined audio files can be stored in a memory, and the processing node plays the correct audio file for the situation.

It should be noted that the audio file may be an analog or digital signal, for example a digital signal that is already stored in a memory, wherein both processing nodes can access the memory containing the audio file.

It should also be noted that the processing unit may be a control unit, a processor or a circuit. In addition, the processing unit can comprise a memory unit for storing data. Moreover, the two processing nodes can be arranged in a shared processing unit, or the two processing nodes can be in a distributed arrangement. In addition, a processing node can be formed by a processing core of a processor.

The second processing node can take into account a multiplicity of audio signals from different audio sources such as a multimedia system or an infotainment system, for example. Furthermore, the audio output can undergo various modifications in the processing of the audio source, for example as a result of taking into account the speed of the vehicle, the source signal level, the amplifier temperature, the source(s) selected by the user, and sources mixed therewith by the audio source, for instance navigation announcements, or the sound level in the vehicle interior, for instance in the case of hands-free equipment.

According to one embodiment, a multiplicity of audio sources can be taken into account in the computation of the audio output, for instance a radio, an Internet radio, a CD player, an AUX connection, a Bluetooth interface, a navigation system, or hands-free equipment.

According to one embodiment, the processing unit also comprises an audio output system (DMA controller). The audio output system is designed for cyclical reading and continuous output of the audio output segments stored in the program memory.

The audio output segments computed by the first or second processing node and saved cyclically in the program memory can thus be output acoustically by the audio output system so that this audio output is audible to a user.

According to one embodiment, the audio output system also comprises a loudspeaker. This loudspeaker is designed to convert into an acoustic signal the audio output that is stored in the program memory and output by the audio output system.

According to another embodiment, the program memory comprises a first memory area and a second memory area. The processing unit, or the first or second processing node, is designed first to overwrite the first memory area with the audio output cyclically and segment by segment, and to switch to the second memory area when the first memory area is overwritten up to the predefined point. The first memory area may be overwritten for an entire audio segment by the audio output computed by the first processing node, in order then to switch to the second memory area and overwrite this area entirely with the next segment of the forthcoming audio output. The audio output system is designed to output the audio output saved in the first memory area, and when this has been output, to switch to the audio output saved in the second memory area.

In other words, the audio output system can output alternately the audio output saved in the first and second memory areas in order for buffered and uninterrupted output of the audio output to take place. The processing unit is designed to overwrite the first memory area again with the audio output when the audio output saved in the first memory area has been output and when the second memory area is overwritten up to a predefined point, in order that the first memory area and the second memory area are each alternately overwritten with the audio output. This results in a ping-pong buffer that is alternately overwritten and read out, and is then switched between one memory area and the other. In other words, the second memory area can be overwritten with the forthcoming audio output during the output of the audio output saved in the first memory area, and vice versa. The memory areas may be the same size and are overwritten up to a predefined point by the first or second processing node. Alternatively, the shared memory for audio data can be organized also as a circular buffer, which allows the processing unit to write a plurality of audio segments cyclically one after the other, and allows the audio output system to read a plurality of already written audio segments.

Now follows a detailed description of the audio output system using a directly addressable shared program memory (DMA) and of how it works. The first processing node computes the audio output and saves this in one of the two memory areas, for instance computes part of an audio file. This computed audio output can be written in a fixed size, e.g. N=8192 samples=data transfer block or audio segment, alternately to two different memory areas (buffers) in the main memory. These memory areas can start at the addresses A (first memory area) and B (second memory area) respectively, or be directly adjacent to each other. After the processing unit has started up, both memory areas are first overwritten with the audio output computed by the first processing node.

The controller of the audio output system for the program memory ("DMA controller") typically allows setting of these two addresses A and B and the number N of memory words (equal to the audio samples of the audio output) of the memory area to be transferred and allows starting of the DMA data transfer process. The DMA controller can alternately load the addresses A or B when the number N of data items has been transferred from a memory area to the conversion for the audio output signal. In addition, the address of the DMA interrupt service routine, to which a processing node jumps as a result of an interrupt signal from the DMA controller to the processing unit when the number N of transferred memory words is reached, can be entered in the interrupt vector table of this processing node.

Start address A: before the start of the very first audio output, the first processing node writes the first two audio segments into the program memory starting from address A and address B. The data transfer to the audio sink, which is controlled at the audio rate, now begins at address A by the first processing node starting the DMA transfer mechanism. The DMA controller subsequently reads out automatically and continuously, without the involvement of the processing nodes, the main memory starting from address A, and transfers the audio output at the rate of the audio sink to the peripherals, where the audio output is then serialized or converted to analog and is output to other components outside the processing unit (also known as an SoC (System on Chip)) (typically an amplifier with loudspeakers connected to the output). When address A is read, the internal read address of the DMA controller can be incremented as soon as an audio sample is output to the audio sink at the audio output rate, in order for the next sample of the audio output to be read from the program memory by the DMA controller and transferred to the peripherals.

Follow-on address B: when the number of items of data to be transferred is reached, the read address B is loaded by the DMA controller for the data transfer, and the DMA controller generates an interrupt signal, which interrupts the program execution by the first processing node and ensures an interrupt service routine is run on the first processing node. In this interrupt service routine, the data area in the main memory is overwritten again with a new audio output starting from address A. Meanwhile, the output of the audio output by the DMA controller continues, starting from address B, and the read address is incremented again until all the audio output data from this memory area is read. The DMA controller then continues with the transfer of the audio output starting from address A.

Follow-on address A: at that moment, the DMA controller again signals an interrupt signal to the first processing node, which interrupts the normal program execution, and allows the memory area currently being output to be overwritten by the interrupt service routine starting from address B, while at the same time the audio output most recently computed by the first processing node is output by the DMA controller to the peripherals starting from address A.

Thus the effect of the output of the audio data by DMA can be described as follows: for the playback period of the audio output, the output of the audio output can proceed unhindered and without disruption without the involvement of a processing node, while any program changes or state changes are possible on the processing node. It would even be possible to reinitialize the processing node completely if the size of the memory area is large enough.

According to one embodiment, the processing unit is designed to perform the handover of the computation of the audio output from the first processing node to the second processing node when the first processing node has overwritten the first memory area or the second memory area up to the predefined point and when the second processing node is operational.

The handover between the first processing node and the second processing node may take place when the first memory area or the second memory area is overwritten up to the predefined point, with the first memory area or the second memory area being overwritten in full. If the first or second memory area is overwritten up to the predefined point, the audio output saved there can be output by the audio output system, and in the meantime, the second processing node can compute the forthcoming audio output, and in turn write this audio output to that memory area that is not currently being used for the output of the audio output. Thus, the handover can take place during the output without any interruption to the output of the audio output.

According to one embodiment, the program memory comprises a third memory area. The first processing node is designed to store in the third memory area, whenever the first memory area or the second memory area has been overwritten up to the predefined point, the exact playback position of an audio file accessible to both processing nodes, in order that a seamless handover of the audio output is possible.

A seamless handover of the computation can be achieved by virtue of storing the exact playback position of the audio file accessible to both processing nodes. The second processing node thereby knows at what point it is meant to start with the computation of the audio output, and thus an interruption or jump in the output of the audio output is prevented.

According to another embodiment, the first processing unit is designed to trigger, once the first memory area or the second memory area has been overwritten up to the predefined point, an interrupt signal which signals that the first memory area or the second memory area is overwritten up to the predefined point. The second processing node is designed to take over the audio output in response to this interrupt signal by said second processing node reading the exact playback position from the third memory area, computing the forthcoming audio output, and saving this audio output in the first memory area or in the second memory area, whichever is not currently being used for the output of the audio output.

The interrupt signal can be used to signal to the second processing node when a handover of the computation is able to take place. After the interrupt signal, the second processing node can take over the computation by reading the exact playback position from the third memory area and computing on the basis thereof the forthcoming audio output. The second processing node can then save this audio output in the program memory, so that the output of the audio output can proceed seamlessly.

According to one embodiment, the first memory area and the second memory area are each of a size that corresponds to an output time of the audio output t. The output time of the audio output t is longer than the time needed for the handover.

This time of the audio output t can be 10 ms or 100 ms, for example. In other words, the first and second memory areas are each designed to be of a size that allows this memory area to store, for example, 10 ms or 100 ms of audio output. In addition, the audio output t may also be dynamic, in order that when a handover is imminent, the size of the first memory area and of the second memory area is increased so that more time remains for the handover.

A further aspect relates to a method for the seamless handover of a computation of an audio output. The method comprises: computing an audio output by means of a first processing node; overwriting a program memory with the computed audio output by means of the first processing node; handing over the computation of the audio output from the first processing node to a second processing node when the first processing node has overwritten the program memory up to a predefined point and when the second processing node is operational; computing the audio output by means of the second processing node; and overwriting the program memory with the computed audio output by means of the second processing unit.

A further aspect relates to a vehicle comprising a processing unit for an audio system, which processing unit is described above and below.

For example, the vehicle is a motor vehicle such as a car, a bus or a truck, or else also a rail vehicle, a ship, or an airplane or a helicopter.

A further aspect relates to a program element which, when executed in a processing unit of an audio system, instructs the processing unit to perform the method described above and below.

A further aspect relates to a computer-readable storage medium on which a program element is stored which, when executed in a processing unit of an audio system, instructs the processing unit to perform the method described above and below.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The figures are schematic and not to scale. Where the same reference signs are stated in the following description of the figures, they denote identical or similar elements.

DETAILED DESCRIPTION

Figure 1:
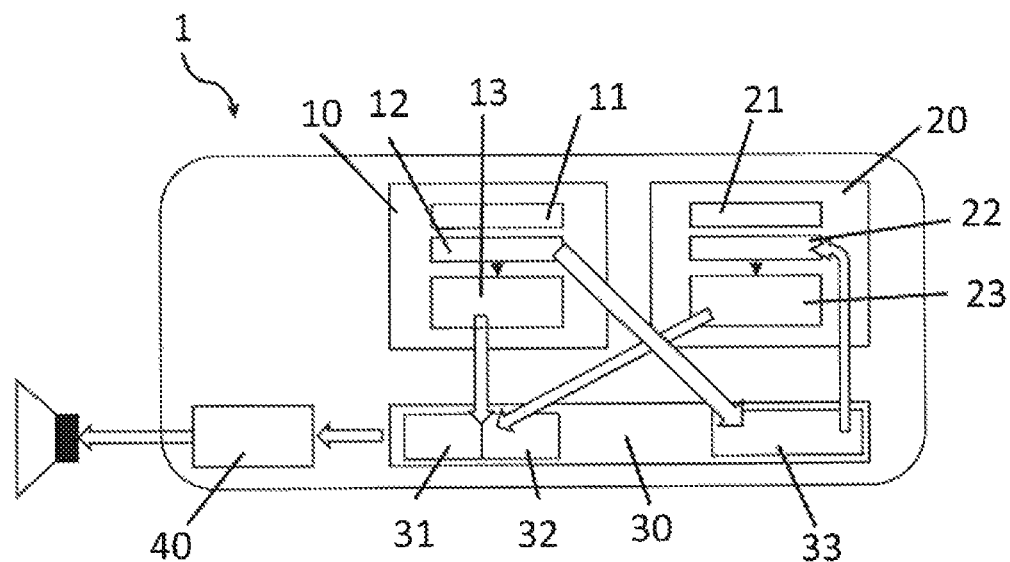
FIG. 1 shows a block diagram of a processing unit according to an embodiment of the invention.

FIG. 1 shows a block diagram of a processing unit 1 of an audio system. The processing unit 1 comprises a first processing node 10, a second processing node 20 and a jointly writeable program memory 30. The program memory 30 in turn comprises a first memory area 31, a second memory area 32 and a third memory area 33. Both processing nodes 10, 20 can overwrite and read this program memory 30, which thus acts as a shared program memory 30. The first and second memory areas 31, 32 are used furthermore for storing the audio output to be output by an audio output system 40. The size of the first memory area 31 and of the second memory area 32 is may be the same and designed such that these memory areas correspond to an output time of the audio output t, where the output time of the audio output t is longer than the time needed for the handover. The audio output t may equal 10 ms or 100 ms, for example. It should be noted that the first and second memory areas may also be dynamic, in order that when a handover is imminent, the memory area can be increased, because the handover must also take place in addition to the computation of the forthcoming audio output. The exact playback position of an audio file accessible to both processing nodes 10, 20 can be stored in the third memory area 33, so that the second processing node 20 can ensure the seamless audio output after the handover. The first processing node 10 comprises a controller 11, a basic audio manager 12 and an audio processor 13 for the basic audio output. The second processing node 20 likewise comprises a controller 21, a full audio manager 22 and an audio processor 23. The first processing node 10 is a fast-startup processing node having a reduced operating system, so that basic audio signals such as warning tones can be computed. The audio processor 13 for the basic audio output writes this computed, basic audio output to the first or second memory area 31, 32 of the program memory 30. These two memory areas 31, 32 can be overwritten alternately with the audio output, with the result that the first memory area 31 is overwritten while the audio output system 40 is reading and outputting the audio output from the second memory area 32, and the second memory area 32 is overwritten when the audio output system 40 is outputting the audio output from the first memory area 31. This results in a ping-pong buffer that is alternately overwritten and read out.

The first or second memory area 31, 32 respectively is overwritten up to a predefined point, for example in full. After each overwriting of the first or second memory area 31, 32, the first processing node 10 generates an interrupt signal that signals to the second processing node 20 that a handover can take place. It should be noted that this interrupt signal only results in a handover of the computation when the second processing node 20 is operational and initiates the handover within a predefined time interval in response to the interrupt signal. In addition, after each overwriting of the first or second memory area 31, 32, the first processing node writes to the third memory area 33 the current playback position of an audio file accessible to both processing nodes 10, 20. On a handover taking place, the second processing node 20 can thereby continue with the computation of the forthcoming audio output at the correct position. It should be noted that the first or second processing node can compute the audio output, for instance on the basis of a sinusoidal signal, or the processing node can determine from a predefined number of audio files the appropriate audio file and playback position, and store, write or save these in the shared program memory 30. Once the handover has taken place, the second processing node 20 computes the audio output, and can also include in the computation further audio functions such as multimedia applications and navigation instructions, whereby a full audio output is possible. This computed audio output is then in turn stored or saved in the shared program memory so that it can be output by the audio output system 40.

Figure 2:
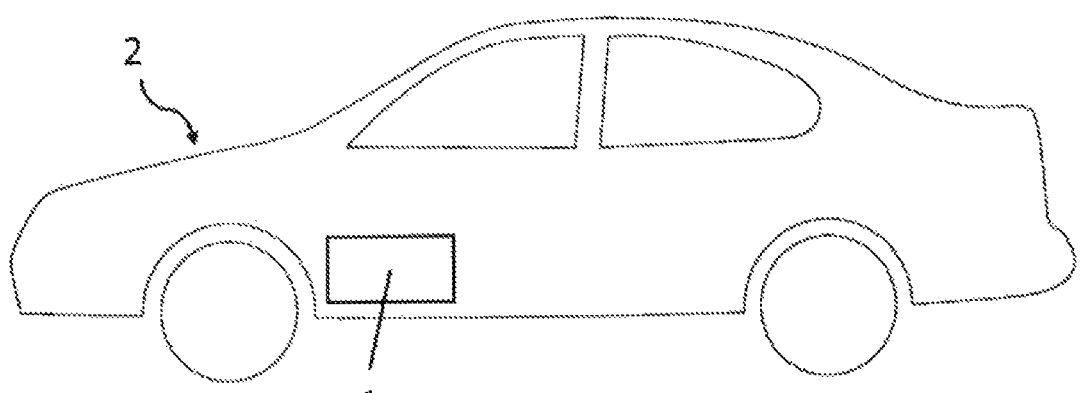
FIG. 2 shows a vehicle having a processing unit according to an embodiment of the invention.

FIG. 2 shows a vehicle 2 comprising a processing unit 1 for an audio system, which processing unit is described above and below. Warning tones, an audio input signal from an audio source such as a radio, for instance, a reference signal and/or a notification signal can be output via the audio system. The warning tones may sound directly after the vehicle is started, which requires a fast-startup system (processing node including operating system) to compute the audio output for this purpose. This is provided by the first processing node of the processing unit 1, which processing node is a fast-startup processing node for the basic audio output. For the rest of the journey, however, the second processing node is meant to take over the computation of the audio output because it has more processing power and hence can compute a more complex audio output (including multiple audio sources and warning signals). This processing node requires longer to start up, however, and thus may be unavailable for computing the audio output at the start of the journey. Consequently, a handover between the first processing node and the second processing node must take place if the second processing node is meant to compute the full audio output. This handover of the computation from the first processing node to the second processing node should be performed here such that the audio output is output seamlessly. In other words, it should not be audible to the driver of the vehicle 2 when the computation of the audio output is handed over.

Figure 3:
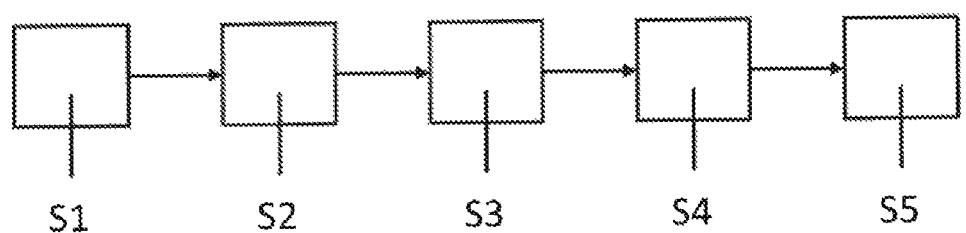
FIG. 3 shows a flow diagram for a method for audio output according to an embodiment of the invention.

FIG. 3 shows a flow diagram for a method for seamless handover of an audio output. In a first step S1, a first processing node computes an audio output. The first processing node writes this computed audio output to a program memory in step S2. In particular, the program memory can comprise two memory areas that are overwritten alternately up to a predefined point by the first processing node. In addition, steps S1 and S2 can be performed repeatedly in succession, for example until a second processing node is operational. In step S3, the computation of the audio output is handed over from the first processing node to the second processing node when the second processing node is operational. In this case, the handover takes place when the program memory has been overwritten up to the predefined point, for example when the program memory, the first memory area or the second memory area have been overwritten in full. In addition, the first processing node can output an interrupt signal when the program memory, the first memory area or the second memory area is overwritten up to the predefined point, in order that the second processing node can thereupon take over the computation of the audio output. In the subsequent step S4, the second processing node computes the audio output. Then in step S5, the second processing node writes this computed audio output to the program memory, the first memory area or the second memory area. It should be noted that both processing nodes can overwrite and read out the program memory, the first memory area or the second memory area. A seamless output of the audio output, despite the handover of the computation thereof, can be ensured by virtue of the entire computation of the audio output being handed over when the program memory is overwritten up to a predefined point for example in full.

Figure 4:
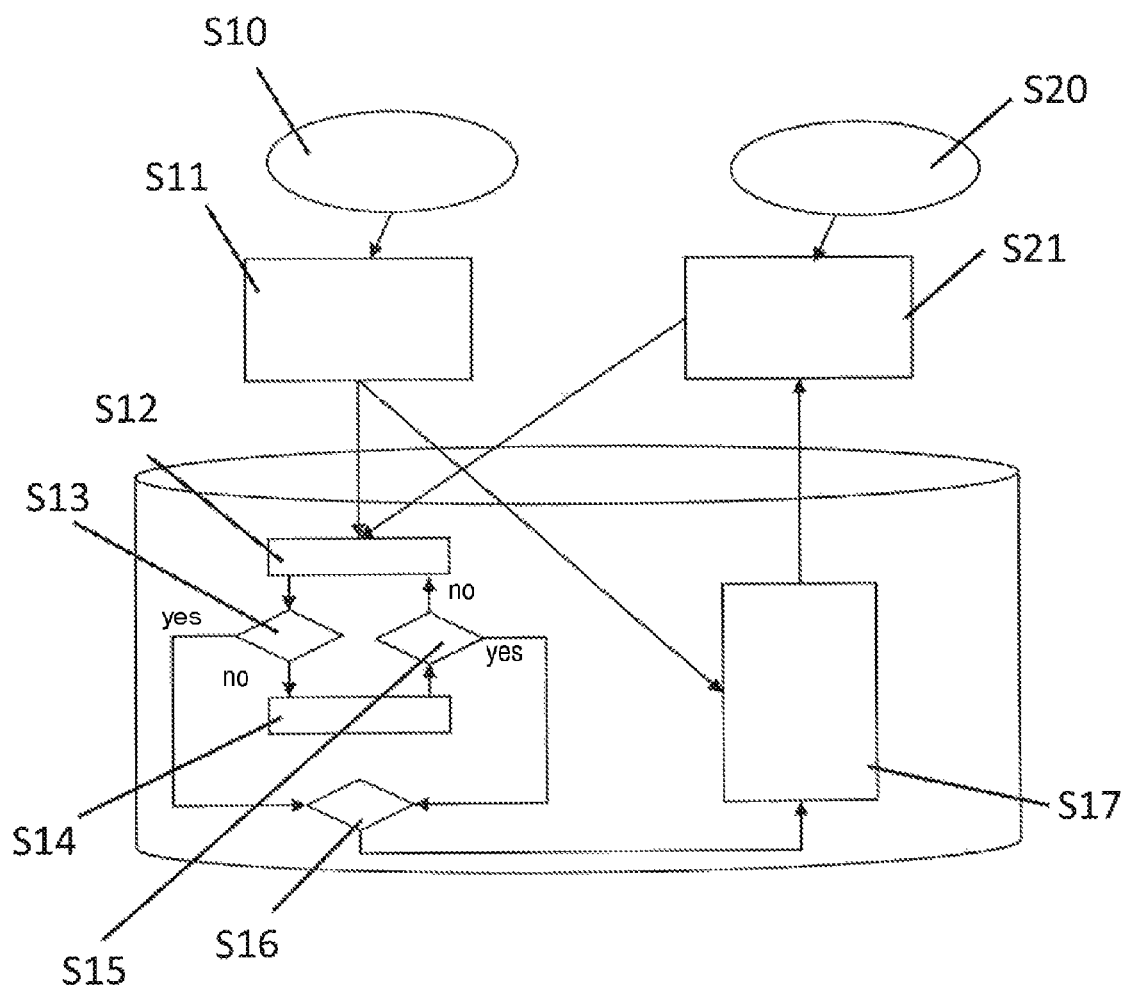
FIG. 4 shows a flow diagram for a method for audio output according to an embodiment of the invention.

FIG. 4 shows a further flow diagram for a method for seamless handover of an audio output. First, in step S10, the first processing node is initialized. In this process, this processing node starts up its operating system so that an audio output can be computed. Step S20 starts at the same time with the initialization of the second processing node. The first processing node is intended for example for computing a basic audio output, for instance warning tones. In step S11, the first processing node computes the audio output and writes the first two audio segments to the directly addressable memory areas starting from address A and B. In this process, the first processing node can compute the audio signals directly or use predefined audio files, in which case the first processing node specifies the exact playback position of these predefined audio files. Thereafter, this processing node starts the transfer of the audio output by the audio output system (the Direct Memory Controller), which first reads the audio data from the address area starting from address A and outputs this audio data to the audio peripherals.

Meanwhile, the second processing node is initialized in the intermediate step S21. This initialization may take significantly longer than the execution of the first follow-on steps S12, S13, S14, S15 and S16 by the first processing node. Once the second processing node has completed its initialization in step S21, it makes a request to the first processing node for audio handover, for instance by writing an agreed value "REQUEST" to a memory address HANDOVER, which address can be read by the first processing node. This memory address may be initialized earlier with a different value.

When the Direct Memory Controller has output its data from the first memory area starting from address A, and has signaled this to the first processing node, for instance using an interrupt signal, the first processing node continues with step S12 and refills the memory area starting from address A, i.e. computes the relevant audio output and stores the audio data starting from address A.

Meanwhile, the Direct Memory Controller continues to read the audio data starting from address B and to output this audio data to the audio peripherals.

After step S12, the first processing node inquires in step S13 whether the second processing node is requesting an audio handover, and does this by checking the value in the memory address HANDOVER to determine whether this address contains the value "REQUEST". If this is not the case, in step S14 the next audio segment is computed while waiting for the Direct Memory Controller to signal that the DMA controller has read the data in full from the memory area starting from address B. Then the newly computed audio segment is written to the program memory starting from address B.

Meanwhile, the Direct Memory Controller continues to read the audio data starting from address A and to output this audio data to the audio peripherals. After step S14, the first processing node again inquires, in step S15, whether the second processing node is requesting an audio handover, and does this by again checking the value of HANDOVER to determine whether this contains the value "REQUEST". If this is not the case, once again there is a wait for the Direct Memory Controller to signal that the DMA controller has read the data in full from the memory area starting from address A, and has output this data to the audio peripherals. The process then continues with step S12.

This cycle repeats until, in steps S13 or S15, the first processing node ascertains, immediately after the signaling by the audio output system, that the address HANDOVER contains the value "REQUEST" and thus the second processing node has requested the audio handover from the first processing node, and both possible flow paths come together in step S16.

The first and second memory areas can hence be overwritten alternately with the computed audio output. The audio output system, however, reads and outputs the audio output stored in the first memory area. As soon as the audio output has been output from the first memory area, the audio output system switches to the second memory area and outputs the audio output saved there. Once this has also been output, the audio output system switches back again to the first memory area, resulting in an alternating output of the audio output. In order to ensure seamless output of the audio output the handover is performed between the two processing nodes when the audio output system is currently playing out the one memory area and the other memory area can be overwritten.

In step S16, the first processing node copies the audio management status (which audio sources are currently active), which address area A or B has most recently been overwritten with audio data, and the exact playback position(s) into a third memory area, and signals this to the second processing node, for instance using an interrupt signal and by means of the jointly read/writeable memory address HANDOVER using the value "NOW", which address the second node polls after step S21.

On the basis thereof, in step S17, the second processing node now computes the audio output and writes this audio output into the first or second memory area starting from address A or B, whichever is not currently being used for the output of the audio output. In addition, the interrupt requests for the audio output are diverted to the second processing node, so that future interrupts by the audio output unit (of the Direct Memory Access Controller) after the output in full of an audio segment starting from read address A or B cause refilling of audio data by the second processing node. The computation of the audio output is thereby handed over from the first processing node to the second processing node without the user being able to perceive any interruption in the audio output.

Figure 5:
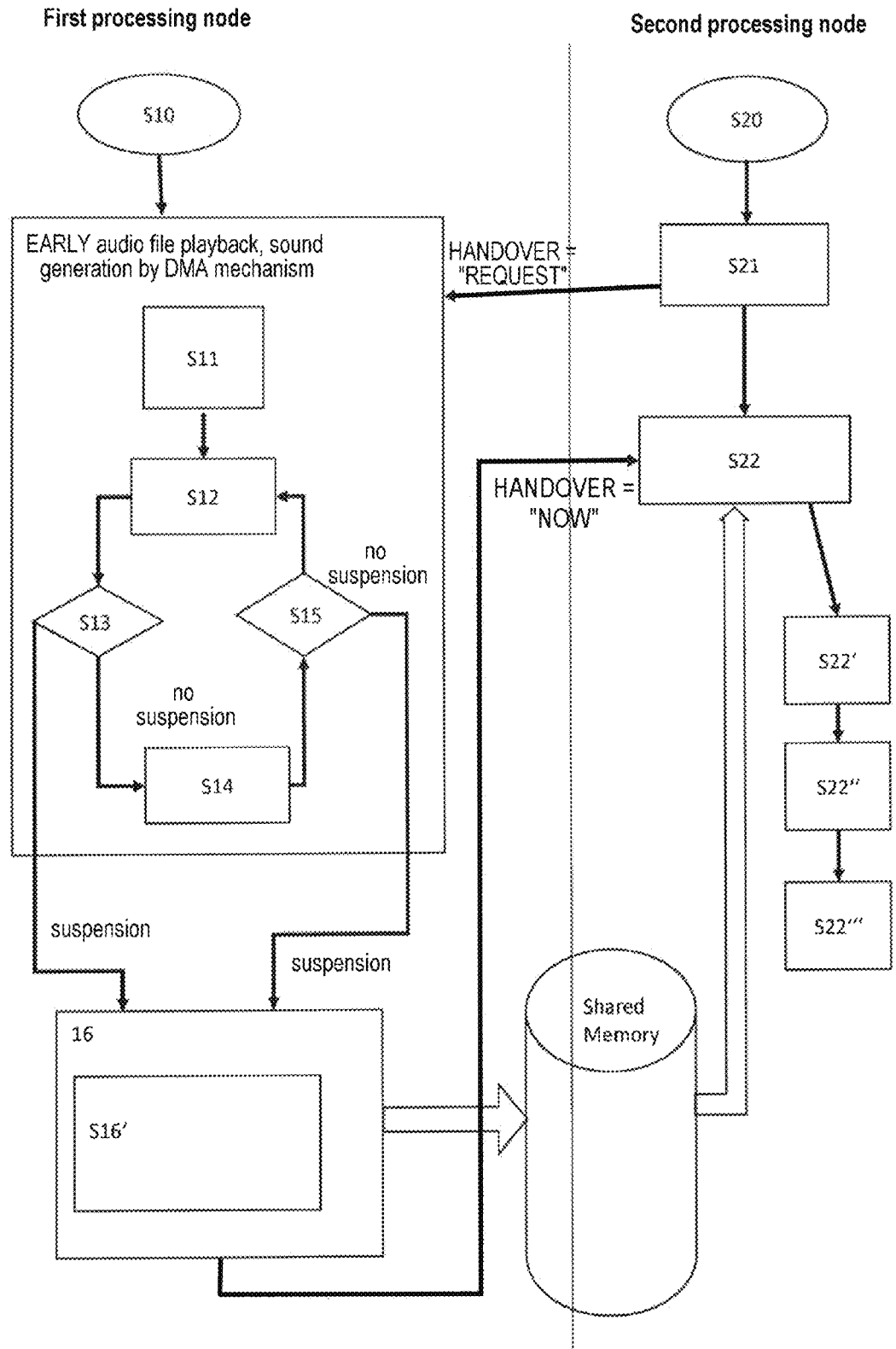
FIG. 5 shows a further flow diagram for a method for audio output according to an embodiment of the invention.

FIG. 5 shows a further flow diagram for a method for seamless handover of an audio output. In this case, two different processing nodes (first and second processing nodes) that are separate from each other are used. This is symbolized by the continuous black line in the center of the diagram. The handover of the computation of the audio output (suspension) takes place from the first processing node to the second processing node. In this process, the second processing node can make a request for the handover (HANDOVER="REQUEST"), and the first processing node can initiate the handover (HANDOVER="NOW") when a memory area has been overwritten up to a predefined point. This procedure is represented by the dashed arrows in FIG. 5. The black arrows symbolize a sequence of operating steps. Both processing nodes can access the program memory (shared memory). The individual method steps and states are explained in brief below.

S10: Initialization of the first processing node (Early)
S11: Initialization (e.g. reading the audio file by the file system); filling of DMA buffers A and B, output from buffer A
S12: Refilling of buffer A and output from DMA buffer B
S13: Suspension possible? Interrupt signal is triggered
S14: Refilling of buffer B and output from DMA buffer A
S15: Suspension possible? Interrupt signal is triggered
S16: If suspension: AudioManagement status handover
S16': as a substep of S16; copy the AudioManagement status, the exact playback position (of the audio file and of the sound generation parameters) into the shared memory
S20: Initialization of the second processing node (Multimedia)
S21: Suspension request by the second processing node to the first processing node; set HANDOVER to "REQUEST"
S22: Wait for HANDOVER="NOW"; read AudioManagement status and playback position from the shared memory
S22': AudioManagement initialization, audio file playback from last playback position
S22'': Transfer of the DMA interrupts to the second processing node
S22''': Audio file playback, audio output by DMA mechanism.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A processing unit for an audio system of a vehicle comprising:
 a first processing node;
 a second processing node;
 a program memory designed to be overwritten by the first processing node and by the second processing node, wherein after the processing unit has started up, the first processing node computes and writes to the program memory an audio output; and
 an audio output system, which outputs the audio output saved in the program memory,
 wherein the processing unit performs a handover of the computing of the audio output from the first processing node to the second processing node when the first processing node has overwritten the program memory up to a predefined point and the second processing node is operational; and
 wherein the second processing node computes the audio output after the handover and writes this audio output to the program memory,
 wherein the program memory comprises a first memory area and a second memory area, wherein the processing unit first overwrites the first memory area with the audio output, and switches to the second memory area when the first memory area is overwritten up to the predefined point,
 wherein the audio output system outputs the audio output saved in the first memory area, and then switches to the audio output saved in the second memory area, and
 wherein the processing unit overwrites the first memory area again with the audio output when the audio output saved in the first memory area has been output and when the second memory area is overwritten up to a predefined point, in order that the first memory area and the second memory area are each alternately overwritten with the audio output.

2. The processing unit as claimed in claim 1, wherein the processing unit performs the handover of the computing of the audio output from the first processing node to the second processing node when one of: the first processing node has overwritten the first memory area; and the first processing node has overwritten the second memory area up to the predefined point and when the second processing node is operational.

3. The processing unit as claimed in claim 1, wherein the program memory comprises a third memory area, wherein the first processing node stores in the third memory area the exact playback position of an audio file accessible to the first processing node and the second processing node for a seamless handover of the audio output when one of the first memory area and the second memory area have been overwritten up to the predefined point.

4. The processing unit as claimed in claim 3, wherein the first processing node triggers an interrupt signal which signals that one of the first memory area and the second memory area are overwritten up to the predefined point; and
 wherein the second processing node takes over the audio output in response to the interrupt signal by said second processing node by reading the exact playback position from the third memory area, computing the audio output, and saving the audio output in the first memory area or in the second memory area.

5. The processing unit as claimed in claim 1, wherein the first memory area and the second memory area are each of a size that corresponds to an output time of the audio output t, and wherein the output time of the audio output t is longer than the time needed for the handover.

* * * * *